Patented Dec. 25, 1923.

1,478,968

UNITED STATES PATENT OFFICE.

CHARLES S. LENZ AND HARRY MEYER COHEN, OF NEW YORK, N. Y.

PROCESS OF MAKING MEAT CASINGS.

No Drawing. Application filed March 29, 1922. Serial No. 547,783.

*To all whom it may concern:*

Be it known that we, CHARLES S. LENZ and HARRY M. COHEN, citizens of the United States, and residents of the city of New York, borough of Manhattan, in the county of New York and State of New York, have invented a new and Improved Process of Making Meat Casings, of which the following is a full, clear, and exact description.

This invention relates to improvements in containers or casings for meats, as sausage-skins and to a novel process of producing meat containers or casings to have the following characteristics:

First, a casing which will be absolutely sanitary, composed principally of a food product, will not contain any substance injurious to the health, and will not develop any chemical actions detrimental to the contents thereof when used to contain uncooked or uncured meats to be cooked or cured while contained in the casing.

Second, a container or casing for sausages of various kinds, which will have the same appearance and color as the gut now commonly employed for the purpose, and a container which will conform constantly to the shape of the filling therein while going through the cooking and curing processes.

Third, a container or casing so formed that the finished cured sausage may be cut and served in the usual manner after which the container or outer covering may be conveniently removed from the contents without adhering permanently thereto.

Fourth, a porous container or casing which will facilitate, rather than impede the boiling and smoking processes.

We are fully away that various substances and forms of casings have been proposed and tried out by the trade in the past, but none of these have been found satisfactory. The ordinary animal gut commonly employed is highly undesirable for the purpose, principally because of the deterioration of the gut, caused mainly by the ravages of grub worms and their eggs prevailing in great numbers in the walls of the bowels of the living animal. These insects can be seen, but not removed in the cleaning process of the gut and very often cause a serious rupture during the process of manufacture, or else contaminate the contents of the casing. This condition is especially prevalent during the warmer part of the year and amounts in some instances, to as much as 50% loss through deterioration caused by the various types of worm and insect life in the walls of the animal's intestines, which actually germinate and produce during the storage of the finished product.

The invention will be clearly understood by the matter which follows, describing the process of making the casing and the materials which are used in this process.

In carrying out the invention, we use as a base or stress resisting element, a body which is of woven fabric, being composed either of silk threads, cotton threads, or any other thread suitable for the purpose. We preferably, but not necessarily, so arrange the material forming the casing that the threads run diagonally to the longitudinal axis thereof, whereby the casing will be free to expand or contract during the boiling and smoking processes. It is also necessary that the casing be sufficiently porous to allow moisture to evaporate therethrough and improve the maturing of the food contained therein, and a container which may be cut in serving without mixing with the food so that the contents thereof may be easily removed.

This netting or fibrous membrane is first thoroughly soaked, cleaned and dried to free the same from all chemicals and impurities. After the cleaning operation, the base is dipped in albumen, preferably egg white, and dried. This dipping and drying process is repeated until the threads of the netting or membrane are thoroughly saturated with albumen and a sufficient amount of albumen has adhered thereto. The drying of the albumen upon the netting will serve to stiffen the same and in order to insure flexibility of the casing, the netting with the dried albumen thereon is plunged into boiling water and boiled until a porous flexible skin is formed. When thoroughly dry the casing is soaked in cold water to further increase the flexibility of the same. After this operation the netting is sewed or adherently connected to form the usual tube, which may be filled with meat in a raw condition. The casings formed in the manner above described are sufficiently porous to facilitate rather than hinder the boiling and curing operations of the meat. During these operations the casings, due to the properties of the albuminous substance, will take the natural smoking and coloring, as with the case of real animal gut. During the curing process the albuminous substance also forms a natural affinity for the meat as it is cooked, just as in the case of the natural animal gut and is capable of being removed with equal facility.

We have described one of the preferred embodiments of the invention, and a preferred process of forming the article, but it will be evident that numerous slight changes and alterations might be made in the general form and arrangement of the parts described without departing from the invention, and hence we do not wish to limit ourselves to the precise details set forth, but shall consider ourselves at liberty to make such slight changes and alterations as fairly fall within the spirit and scope of the appended claims.

We claim:

1. A process of making casings wherein raw meat is adapted to be cooked and cured and which casings comprise solely a stress-resisting element of fabric and a skin of albuminous substance in which such fabric is embedded; said process including the steps of (1) dipping a fabricated foundation into an albuminous solution whereby to saturate the fabric, (2) drying the coated fabric, and (3) treating the coated fabric to induce flexibility.

2. A process of making a casing comprising solely a stress-resisting element of fabric, and a skin of albuminous substance in which such fabric is embedded, and wherein raw meat is adapted to be cooked and cured, including steps of (1) dipping a fabricated foundation into an albuminous solution whereby to saturate the fabric, (2) drying the coated fabric, (3) thermally treating the coated fabric to induce flexibility.

3. A process of making a casing comprising solely a stress-resisting element of fabric, and a skin of albuminous substance in which such fabric is embedded, and wherein raw meat is adapted to be cooked and cured, including steps of (1) dipping a fabricated foundation into a cold albuminous solution whereby to saturate the fabric, (2) drying the coated fabric, (3) treating the coated fabric to induce flexibility.

4. The process defined in claim 3, wherein such thermal treatment involves plunging the dry article into boiling water and there immersing it until the same is in effect one solid flexible skin, subsequently drying the article in a moderate temperature, and then dipping the article into cold water.

5. The process defined in claim 3, wherein such thermal treatment involves plunging the dry article into boiling water and there immersing it until the same is in effect one solid flexible skin, subsequently drying the article in a moderate temperature, and then dipping the article into cold water; steps (1) and (2) being performed in the sequence indicated a plurality of times before performing said thermal treatment.

CHAS. S. LENZ.
HARRY MEYER COHEN.